(12) United States Patent
Fish

(10) Patent No.: US 7,306,078 B2
(45) Date of Patent: Dec. 11, 2007

(54) COMPOSITE BRAKE CYLINDER

(75) Inventor: Elson Fish, Lakeville, IN (US)

(73) Assignee: Polygon Company, Walkerton, IN (US)

( * ) Notice: Subject to any disclaimer, the term of this patent is extended or adjusted under 35 U.S.C. 154(b) by 274 days.

(21) Appl. No.: 11/237,125

(22) Filed: Sep. 28, 2005

(65) Prior Publication Data
US 2006/0191407 A1    Aug. 31, 2006

Related U.S. Application Data

(60) Provisional application No. 60/656,318, filed on Feb. 25, 2005.

(51) Int. Cl.
*B60T 13/04* (2006.01)
(52) U.S. Cl. .................. 188/166; 188/170; 92/128; 92/169.2
(58) Field of Classification Search .............. 188/166, 188/167, 170, 33, 265; 92/212, 128, 29, 92/169.1, 169.2
See application file for complete search history.

(56) References Cited

U.S. PATENT DOCUMENTS 3,183,795 A * 5/1965 Kirk ........................ 92/212
5,006,291 A    4/1991 Fish
5,465,647 A   11/1995 Fish
5,651,303 A    7/1997 Fish
5,669,284 A    9/1997 Fish
7,163,090 B2 * 1/2007 Huber et al. ............... 188/170

FOREIGN PATENT DOCUMENTS

RU   2025345 C1 * 12/1994
SU   1581625 A  *  7/1990

OTHER PUBLICATIONS

AeroSlide(TM) Composite Cylinder Tubing Article; www.polygoncompany.com/product_aeroslidetubing.cfm (Feb. 23, 2005).

* cited by examiner

Primary Examiner—Melanie Torres
(74) Attorney, Agent, or Firm—Barnes & Thornburg LLP; Mark J Nahnsen

(57) ABSTRACT

A composite material and framework structure adapted to be utilized as a piston and cylinder apparatus. A cylindrical tube composed of a composite material is compressed between two end caps at the axial ends of the cylindrical composite tube. Beam elements extend between the end caps and maintain the compression force on the cylindrical composite tube. The cylindrical composite tube comprises a continuous glass fiber reinforced structure embedded in a resin matrix. The resin matrix provides a self contained lubricant system in a resin rich layer, the lubricant system migrating to the inner surface of the cylindrical composite tube.

15 Claims, 7 Drawing Sheets

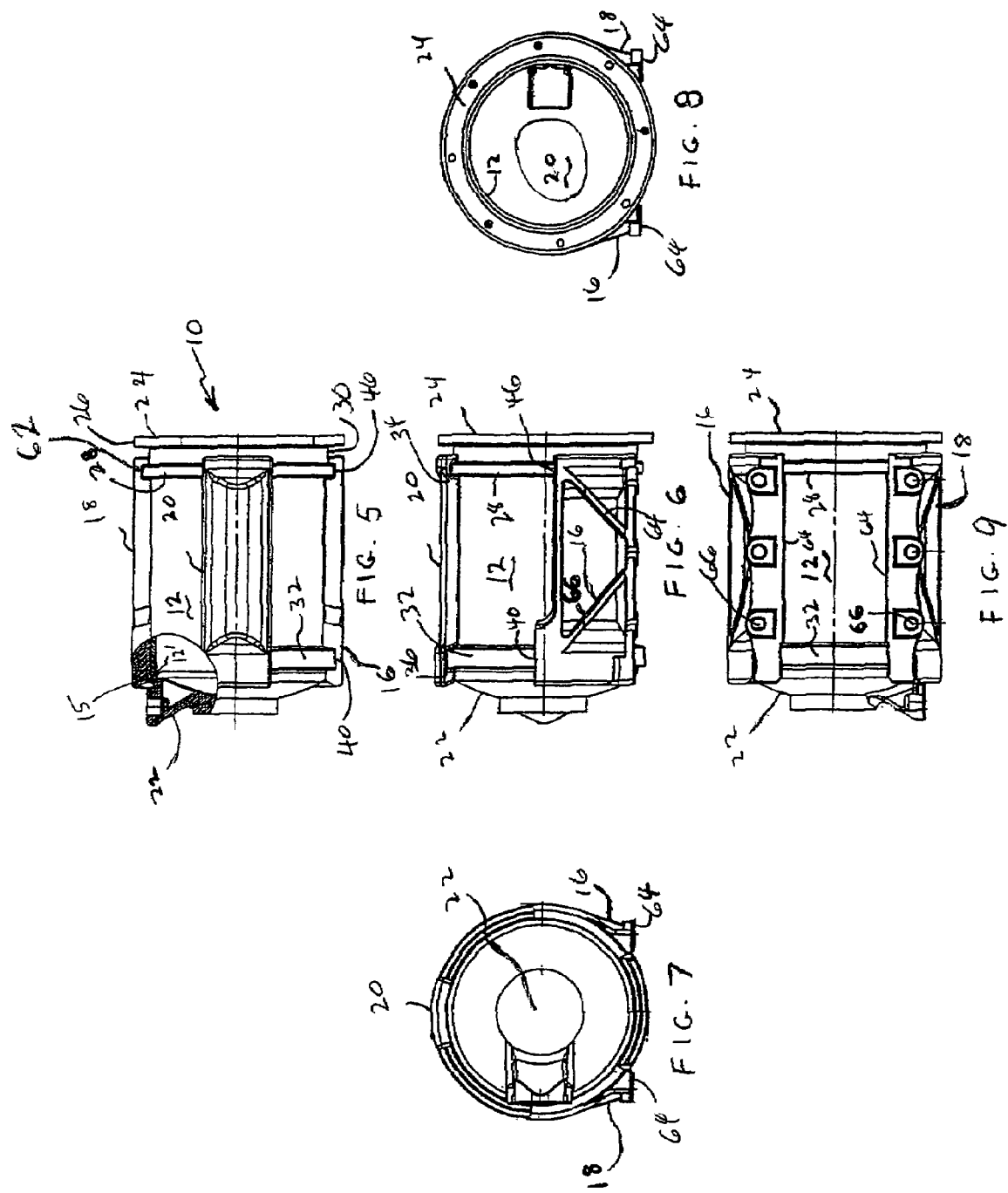

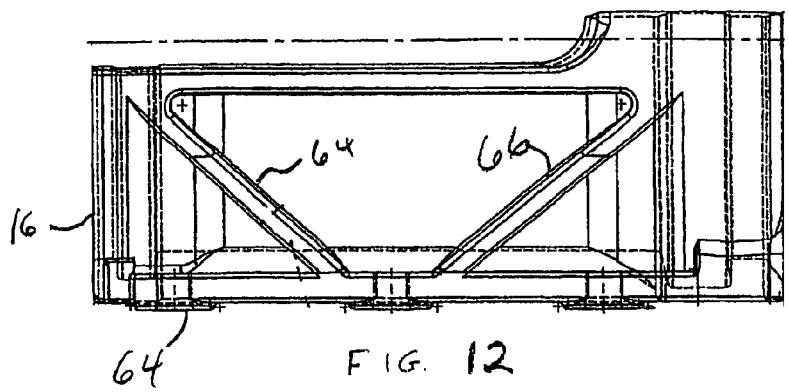
FIG. 12
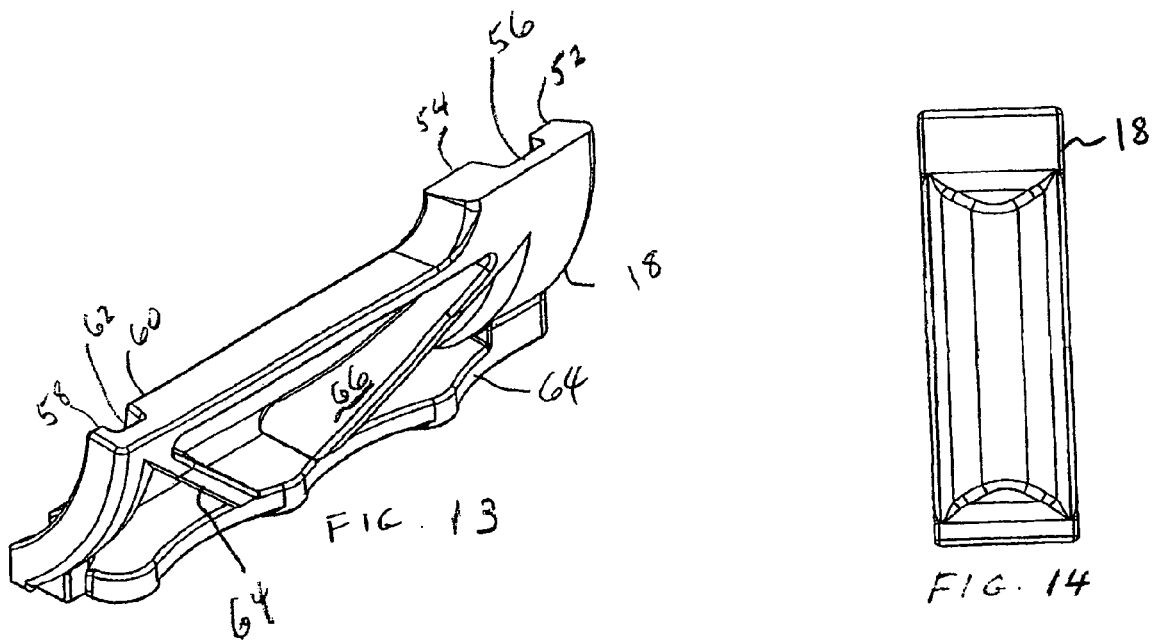
FIG. 13
FIG. 14

COMPOSITE BRAKE CYLINDER

This application is based upon provisional patent application Ser. No. 60/656,318, filed Feb. 25, 2005 and titled "Composite Brake Cylinder" to the extent allowed by applicable law.

FIELD OF THE INVENTION

The present invention relates to the structure and manufacture of brake cylinders of the type used in railroad car brake systems. In particular, the present invention comprises an air or other fluid operated brake cylinder structure having a unique combination of a composite material cylinder and a rigid framework of lightweight, corrosion resistant metallic materials.

BACKGROUND OF THE INVENTION

Presently available air and fluid brake cylinders typically comprise a single piece, cast iron U-shaped cylindrical housing, in which a spring loaded piston head and piston shaft reciprocate to actuate a brake mechanism operatively connected to the piston shaft. The piston head includes a circumferential seal and wear ring that provides the primary load bearing contact between the cylinder bore and the piston, as well as preventing by-pass leakage. The piston shaft extends outward through an opening in the metal housing. The introduction of pressurized fluid, such as air into the cylinder and against the piston head forces the piston shaft to move with respect to the cylinder, and to activate the brake mechanism through movement of the piston shaft. A spring, or other counterbalancing force mechanism, is compressed as the piston head moves under the influence of the pressurized air into the cylinder, and the spring returns the piston head and piston shaft to its non-activated position when air pressure is relieved from the piston head. FIG. 1 is a cross-sectional view of a typical air brake cylinder assembly of the prior art.

The piston head seal and wear ring, as it reciprocates in the cylinder, comes into frictional contact with the cast iron inner wall of the cylinder, causing the piston head to wear upon each movement. This wear results in air leakage around the piston head and a reduction in the air pressure force available to move the piston shaft against the force of the spring to activate the attendant brake device.

The present invention provides a brake cylinder assembly that overcomes these problems by incorporating a relatively low-friction composite material to form a cylinder tube, and an assembly of light weight, corrosion resistant materials to encase the composite cylinder tube under compression, wherein internal pressure resulting from operation of the piston assembly provides a hoop stress in the composite cylinder tube.

The present invention also provides a brake cylinder assembly having a composite cylinder tube that has a relatively low coefficient of friction, an excellent surface finish, and the ability to allow lubricant to migrate to the wear surface between the cylinder wall and the piston head, thus extending seal and wear ring life.

The present invention also provides a combination of a composite cylinder tube and a metallic framework structure applying a compression force to the cylinder tube, resulting in the application of an axial stress in the composite cylinder tube and corresponding reaction forces in the metallic framework structure.

The present invention also provides a composite tube and metallic structure combination that applies a constant compressive stress to the composite tube, resulting in tensile stresses in lateral beams of the metallic structure.

The present invention also provides a compression force near, but not exceeding, the compression strength of the composite cylinder, which takes advantage of the elastic properties of continuous glass fiber reinforced composite structures with specific fiber orientations.

SUMMARY OF THE INVENTION

The above described features are provided in a brake cylinder assembly comprising a composite material cylinder adapted to receive a movable piston and seal and wear ring assembly, and a structural framework partially encasing the composite cylinder. The framework includes lateral beams extending axially along the length of the cylinder, and a blind end cap and a head end cap coupled to the lateral beams to apply a constant compressive force to the composite cylinder. A unique assembly method is employed to construct the brake cylinder assembly of the present invention, including the ability to orient the blind end into any position to simplify part details.

In a completely assembled brake cylinder, internal pressure during operation of the cylinder creates a hoop stress in the composite cylinder tube, as well as a force on the blind end cap and a force on the piston operating in the cylinder. The composite cylinder tube is under constant compression stress, which produces a resulting overall tensile stress in the side and the top beams.

BRIEF DESCRIPTION OF THE DRAWINGS

The above mentioned and other features and advantages of this invention, and the manner of attaining them, will become more apparent and the invention will be better understood by reference to the following description of an embodiment of the invention taken in conjunction with the accompanying drawings, wherein:

FIG. 5 is a top plan view of the composite brake cylinder assembly of the present invention;

FIG. 6 is a side elevation view of the composite brake cylinder assembly of the present invention;

FIG. 7 is one end elevation view of the composite brake cylinder assembly, showing the blind end cap;

FIG. 8 is an opposite end elevation view of the composite brake cylinder assembly, showing the head end cap;

FIG. 9 is a bottom plan view of the composite brake cylinder assembly o the present invention;

FIG. 12 is an elevation view of another side beam of the composite brake cylinder assembly;

FIG. 13 is a perspective view of the outside of the side beam of FIG. 12; and

FIG. 14 is a top plan view of the top beam of the composite brake cylinder assembly of the present invention.

Corresponding reference characters indicate corresponding parts throughout the several views. The exemplification set out herein illustrates an embodiment of the invention, in one form, and such exemplification is not to be construed as limiting the scope of the invention in any manner.

DETAILED DESCRIPTION OF THE ILLUSTRATED EMBODIMENT

Figure 1:
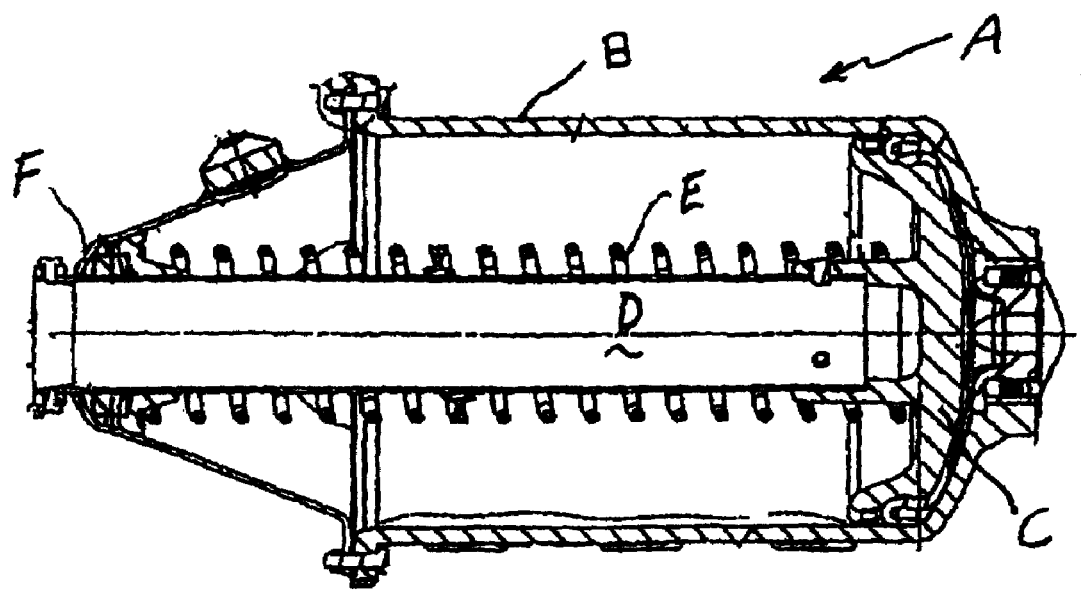
FIG. 1 is a cross section view of a typical prior art brake cylinder assembly, with a cast iron U-shaped housing.

FIG. 1 is a cross-sectional view of a typical prior art brake cylinder assembly A over which the presently claimed invention is a significant improvement. The prior art assembly comprises a single piece cylindrical housing B composed of cast iron and configured in a U-shape. A piston head C and an attached piston shaft D moves axially in the housing B, under the pressure of a fluid, such as, compressed air, brake fluid, or the like that acts upon the piston head C. Spring E abuts end cap F, and biases piston head C and piston shaft D towards its non-pressurized position against the pressure of the fluid acting on piston head C.

Since fluid pressure in brake cylinder assembly A acts in all directions when the brake cylinder is activated, cast iron or another suitable heavy substance is used to form housing B to prevent structural failure of housing B during operation. Also, the piston head comes into continuous friction contact with the cast iron interior wall of the cylinder B, causing the piston head C seal and wear ring to wear and resulting in fluid leakage around the piston head. This produces less fluid pressure available to move the piston shaft against spring E. By providing a low-friction composite material forming the cylinder tube, in combination with an assembly of light weight, corrosion resistant materials to encase the composite cylinder tube, the problems mentioned above in prior cast iron and like brake cylinder constructions can be overcome.

Figure 2:
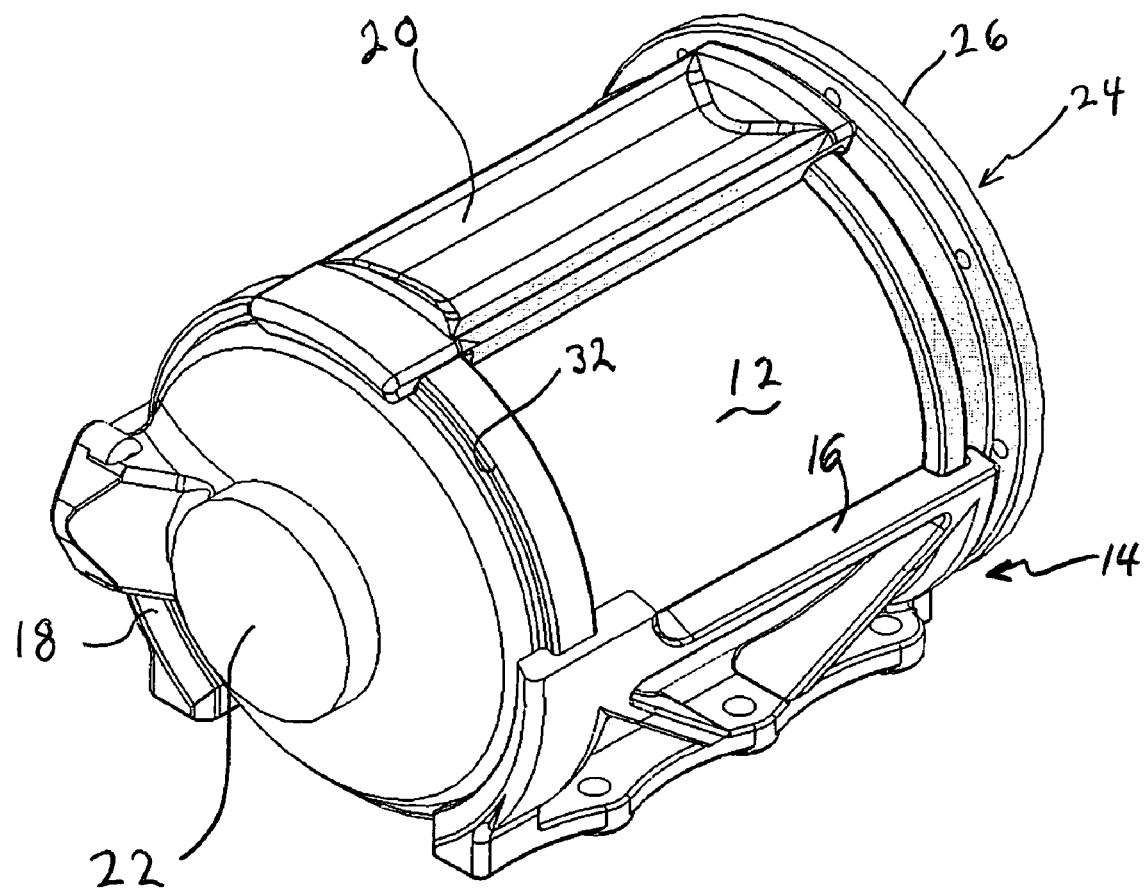
FIG. 2 is an upper perspective view of the composite brake cylinder assembly of the present invention.
Figure 3:
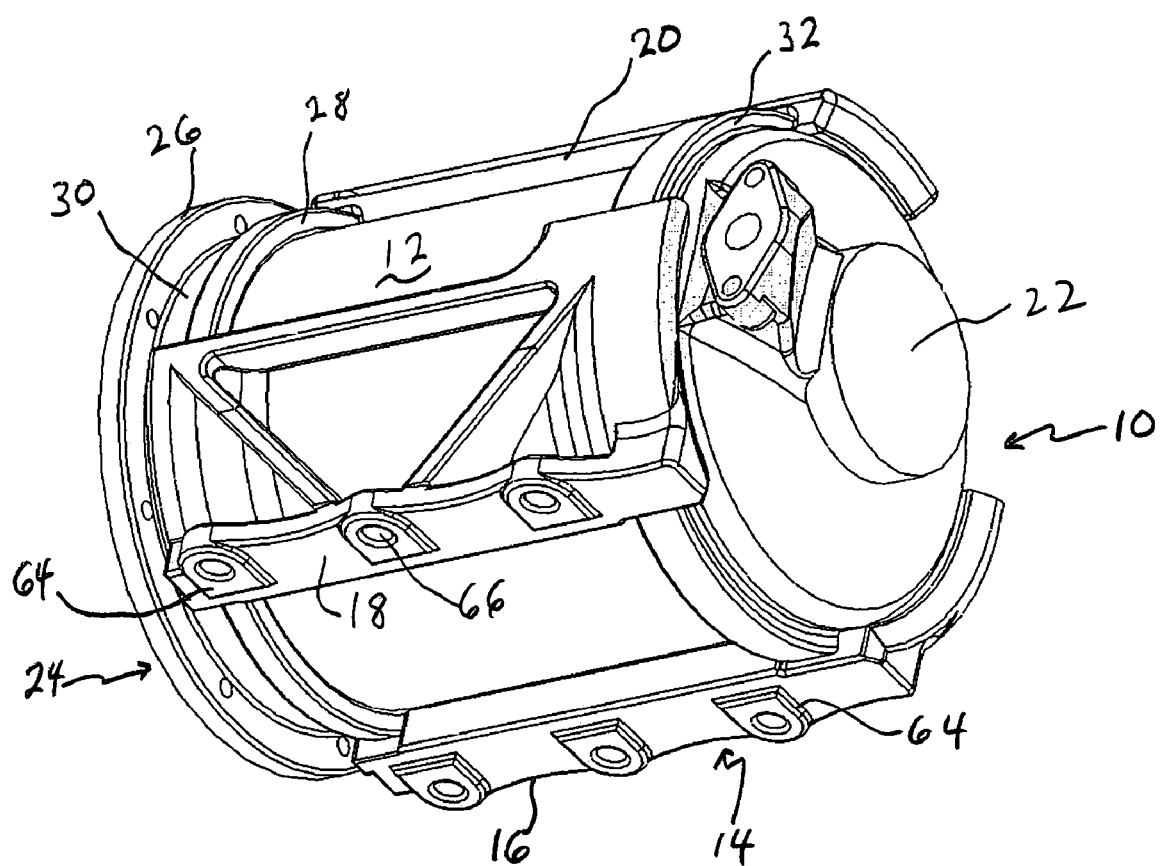
FIG. 3 is a lower perspective view of the composite brake cylinder assembly of the present invention.
Figure 4:
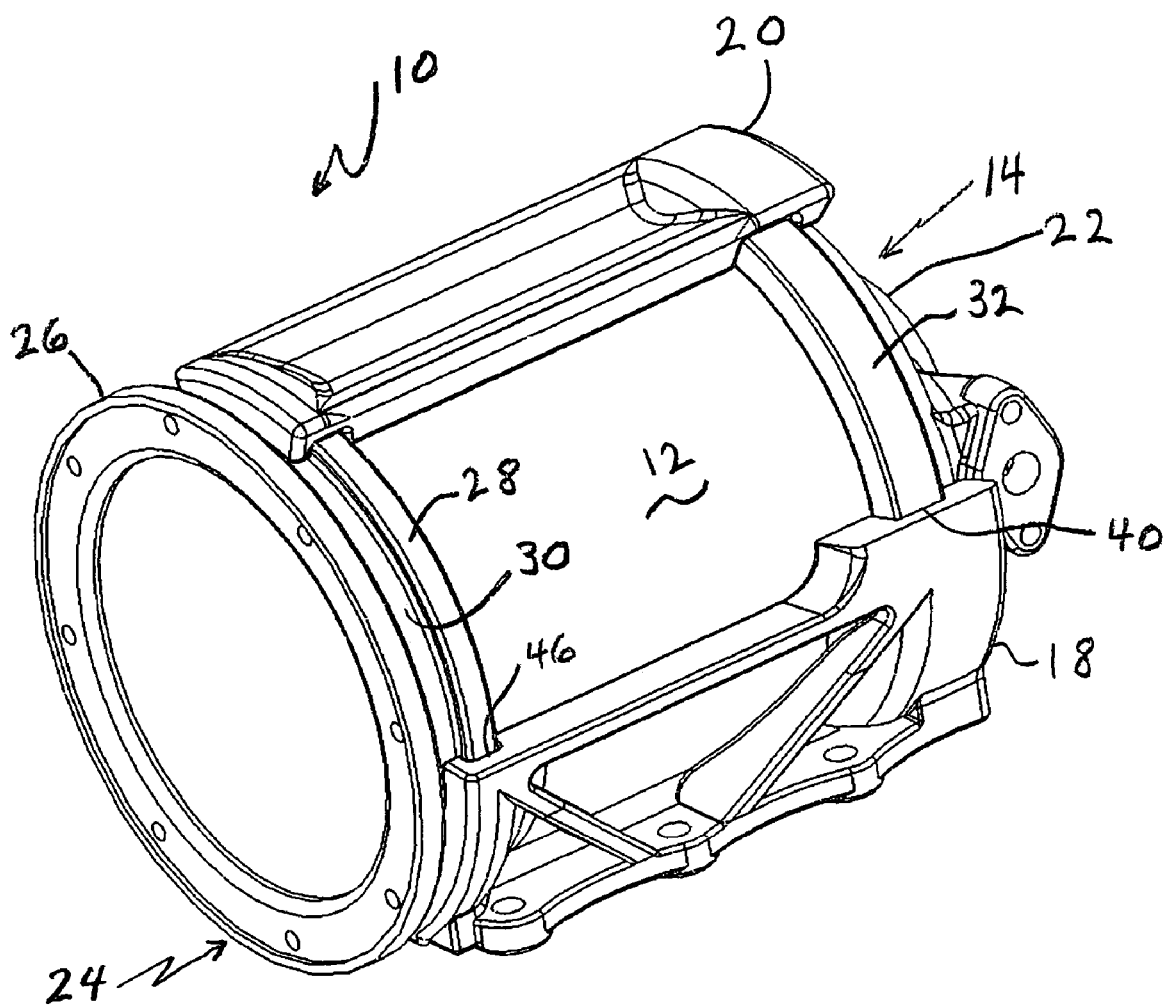
FIG. 4 is a side perspective view of the composite brake cylinder assembly of the present invention.

The present invention is initially illustrated in FIGS. 2, 3 and 4 wherein the brake cylinder assembly 10 comprises a composite cylinder tube 12. The tube 12 is composed of a continuous glass fiber structure embedded in a resin matrix having a self-contained lubricant system packaged into a resin rich layer, the lubricant system migrating to an inner surface of cylinder tube 12. This glass fiber structure and resin matrix material is described in U.S. Published Patent Application No. 2003/0226635A1, published Dec. 11, 2003, and entitled "Seroslide Bearing Cylinder," and is available from Polygon Company, Walkerton, Ind. The contents of U.S. Published Patent Application No. 2003/0226635 A1 are incorporated herein by reference. Similar, equivalent low friction materials may also be used.

The brake cylinder assembly 10 shown in FIGS. 2, 3 and 4 includes a casing a framework structure 14 that comprises a pair of side beams 16, 18, a top beam 20, a blind end cap 22 and a head end cap 24. These beams and end caps are preferably made of aluminum, but any other light weight, corrosion resistant materials may also be used for these parts. A piston head, brake operating shaft and compression spring (not shown) acting between the piston head and the blind end cap 22 are adapted to be installed inside the composite cylinder 12 as is known in the art.

Referring to FIGS. 5-9, the head end cap 24 of brake cylinder assembly 10 comprises a circumferential face flange 26 and a circumferential beam engagement flange 28, with a circumferential groove 30 disposed between flanges 26 and 28. Blind end cap 22 comprises a circumferential flange 32. Referring to FIG. 6, top beam 20 includes a groove 34 at one end and a groove 36 at an opposite end. Groove 34 is adapted to fit over and engage flange 28 of head end cap 24. Groove 36 is adapted to fit over and engage flange 32 of blind end cap 22.

Figure 11:
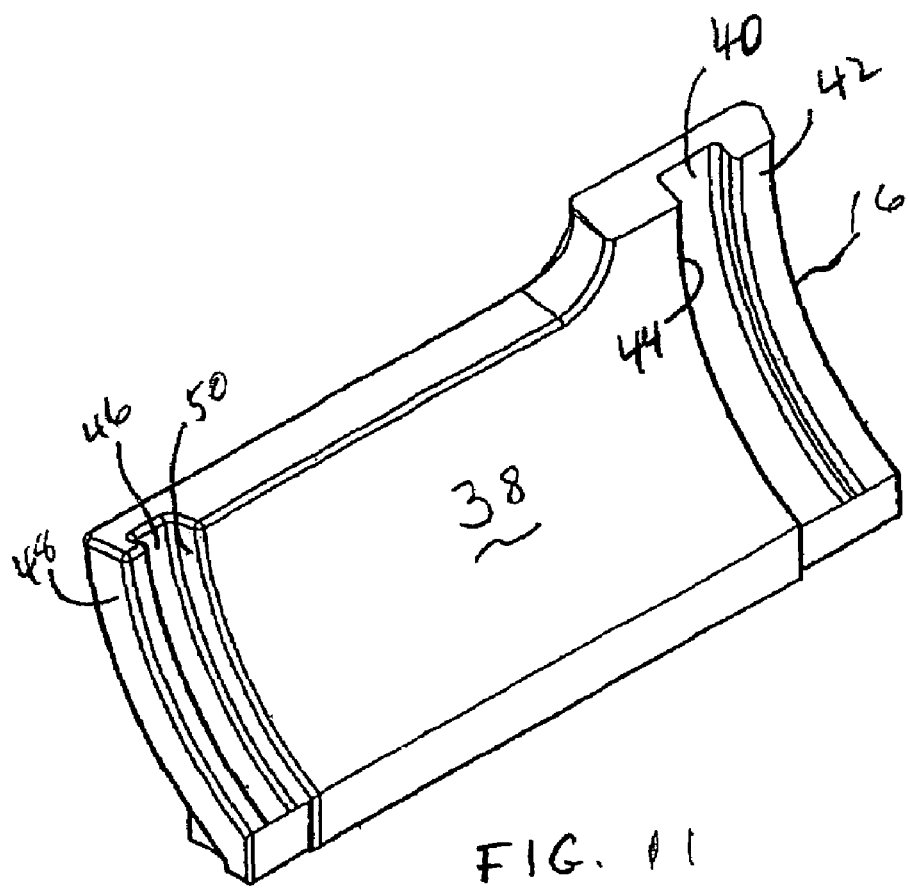
FIG. 11 is a perspective view of the inside of the side beam of FIG. 10.

In similar fashion, the inner surface 38 (FIG. 11) of one end of side beam 16 comprises a groove 40 formed between flanges 42 and 44. Inner surface 38 of side beam 16 at a second end includes a groove 46 formed between flanges 48 and 50. Groove 40 is adapted to fit over and engage flange 32 of blind end cap 22 (FIGS. 3, 5). Groove 46 is adapted to fit over and engage flange 28 of head end cap 24 (FIG. 6).

Side beam 18 is constructed similarly, but oppositely in an axial direction, to side beam 16. Referring to FIG. 13, one axial end of side beam 18 includes flanges 52 and 54 forming a groove 56 therebetween. At the opposite end of side beam 18, flanges 58 and 60 form groove 62 therebetween. As seen in FIGS. 3, 4, 5 and 9, groove 56 is adapted to fit over and engage flange 32 of blind end cap 22, and groove 62 of side beam 18 is adapted to fit over and engage beam engagement flange 28 of head end cap 24.

Figure 10:
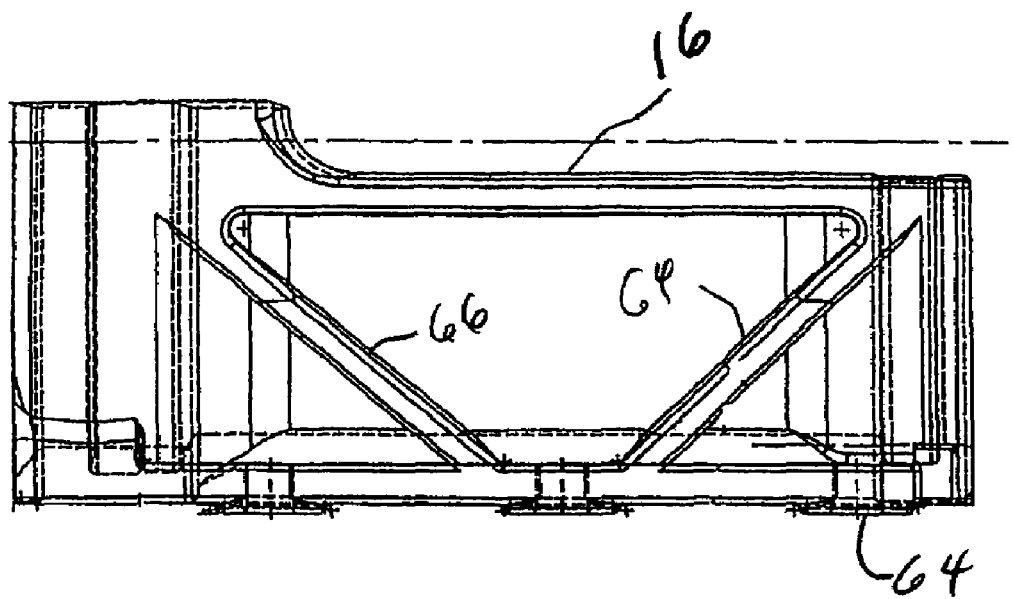
FIG. 10 is an elevation view of one side beam of the composite brake cylinder assembly.

As shown in FIGS. 10 and 12, each of the side beams 16, 18 comprise truss members 64, 66 that provide tensile strength to each side beam as axial forces are applied to the flanges 42, 48 (FIG. 11) and 52, 58 (FIG. 13) when the brake cylinder assembly 10 is constructed, and is operating, as will be explained. The present invention contemplates that the flanges 28 and 32, and corresponding grooves 34, 36, 40, 46, 56 and 62 can be angled and/or wedged so that top beam 20 and side beams 16 and 18 will remain in tight engagement with flanges 28 and 32 due to the fact that beams 16, 18 and 20 will be under constant tension forces once brake cylinder assembly 10 is fully assembled. In an embodiment, the radially extending contact bearing surfaces forming a wall of each of flanges 44 and 50 (FIG. 11), and of each of flanges 54 and 60 (FIG. 13), may have a reverse taper that matches a corresponding taper in the end cap circumferential flanges 28 and 32 (FIG. 5). Once the side beams 16, 18 and top beam 20 engage the tapered flanges 44, 50, 54 and 60, the beams cannot disengage from the end caps 22, 24 without compressing the cylindrical composite tube 12 as was done during initial assembly.

The stress conditions in the side beams 16, 18 and beam truss members 64, 66 will vary depending on the operating mode of the cylinder tube 12. Under zero internal pressure, all the beams 16, 18 and beam members 64, 66 will be in tension due to the pre-stress assembly condition. However, when pressurized, the force acting on blind end cap 22 creates a shear and moment condition through the entire assembly 10 as the resulting forces are transferred to the mounting brackets 64. Part of the stress created by this reaction will result in tensile stress in member 66 and compression stress in member 64.

After positioning the beams 16, 18 and 20 as set forth above, the compression force in composite cylinder tube 12 will be relieved, allowing the composite tube 12 to spring back and lock the support beams in position. The composite cylinder tube 12 will always be under compression and the beams 16, 18 and 20 will always be under tension after brake cylinder assembly 10 is fully assembled and ready for operation. The resulting compression force in the composite cylinder tube 12 will be similar to the force in typical tie rod cylinder designs, thus minimizing long term creep.

The bottom extent of each of side beams 16 and 18 include a mounting bracket 64 having a plurality of apertures 66. Mounting bolts (not shown) extend through each of the apertures 66 to enable brake cylinder assembly 10 to be suitably mounted to the rolling stock adapted to be controlled by the associated brake mechanism.

Referring to the cut-out illustration at the upper left corner of FIG. 5, it is evident that the bottom axial edge 12 of composite tube 12 tightly abuts an inner surface 15 of blind end cap 22, forming a press fit. This maintains the compressive force in composite cylinder tube 12, since the opposite axial end of tube 12 abuts an internal flange position of head end cap 24 (not shown). A seal between the blind end cap 22 and composite cylinder tube 12 is created by the press fit, and without the use of a static elastomeric seal. The elastic properties of composite cylinder tube 12 assist in maintaining constant pressure where the cylinder tube abuts the blind end cap 22, and the head end cap 24. If deemed advantageous, a sealer such as silicon or equivalent may be used to prevent fluid leakage. The non-pressure end of cylinder assembly 10 has a similar press fit joint design as illustrated in FIG. 5 to prevent a fretting condition due to vibration during operation of the device.

In the illustrated embodiment of the composite brake cylinder assembly 10, the top beam 20 and side beams 16, 18 extended between, and are secured to blind end cap 22 and head end cap 24 to form the casing structure 14 enclosing composite cylinder 12, as set forth above. When fabricating the composite brake cylinder assembly 10, the blind end cap 22 and head end cap 24 are oriented and pressed over the ends of composite cylinder tube 12. An axial compression force is then applied to the blind and head end caps 22, 24, causing a compression strain force in the composite cylinder tube 12, and allowing the grooves in top beam 20 and side beams 16, 18 to be positioned and snapped in place over flanges 28 and 32 respectively of the blind and head end caps 22, 24, as explained above. The compression force will approach, but not exceed, the compression strength of the composite cylinder 12. This feature takes advantage of the elastic properties of the composite cylinder tube 12 construction of continuous glass fiber reinforced composite structure with specific fiber orientations.

In the present invention, the blind end cap 22 can be oriented in any circular position, which simplifies the structural details of the end cap. One design for end cap 22 satisfies all orientation requirements and reduces inventory, among other advantages. If deemed necessary, beams 16, 18 and 20 can be fixed or pinned to end caps 22 and 24 to prevent movement during operation. Additionally, the groove 30 at the pressure head end of brake cylinder assembly 10 may be slotted, allowing the beams 16, 18 and 20 to be inserted and positioned in a way that would reduce the compression strain in composite cylinder tube 12.

In a completely assembled brake cylinder assembly 10, the force distribution can be summarized as follows:

a. Internal pressure exerts a hoop stress in the composite cylinder tube 12, a force on blind end cap 22 and a force on the piston operating in the cylinder assembly 12.

b. The side beams 16, 18 carry the resultant shear force on the blind end cap 22, and part of the resulting force moment to the mounting bolts extending through mounting brackets 64.

c. The side beams 16, 18, top beam 20, cylinder tube 12 and head end cap 24 partially carry the force movement to the mounting bolts.

d. The composite cylinder tube 12 is under constant compression stress from the brake cylinder assembly 10, which produces a resulting tensile stress in side and top beams 16, 18 and 20.

The hoop stress in the cylinder tube 12 is primarily a result of the internal pressure during operation of the piston and cylinder assembly 10. The axial compression strain (stress) in the cylinder tube 12 due to the pre-stressed assembly condition also produces a hoop strain (stress) as defined by the Poisson's Ratio property of the composite tube 12 relative to the axial and transverse strain relationship. When the cylinder tube 12 is pressurized during operation, the total hoop stress will be the summation of these two stresses.

The forgoing description of a preferred embodiment of the invention has been presented for purposes of illustration and description, and is not intended to be exhaustive or to limit the invention to the precise form disclosed. The description was selected to best explain the principles of the invention and practical application o these principals to enable others skilled in the art to best utilize the invention in various embodiments and various modifications and are suited to the particular use contemplated. It is intended that the scope of the invention not be limited by the specification, but be defined by the claims set forth below.

I claim:

1. A composite material and framework structure adapted to be utilized as a piston and cylinder apparatus, the structure comprising:
   a) a cylindrical tube comprised of a non-metallic composite material;
   b) the framework including end caps engaging the cylindrical composite tube at opposite axial ends of the cylindrical composite tube;
   c) the framework also including at least one beam element extending between and engaging the end caps, the at least one beam element applying a compression force to the cylindrical composite tube through the end caps and creating a hoop stress in the cylindrical composite tube;
   d) the at least one beam element being in tension.

2. The composite material and framework structure of claim 1 wherein the composite material comprises a continuous glass fiber reinforced structure embedded in a resin matrix.

3. The composite material and framework structure of claim 2 wherein the resin matrix provides a self contained lubricant system in a resin rich layer, the lubricant system migrating to an inner surface of the cylindrical composite tube.

4. The composite material and framework structure of claim 3 wherein the inner surface of the cylindrical composite tube has a low coefficient of friction.

5. The composite material and framework structure of claim 1 wherein the compression force applied to the cylindrical composite tube approaches, but does not exceed, the compression strength of the cylindrical composite tube.

6. The composite material and framework structure of claim 1, wherein the end caps comprise a first blind end cap having an aperture therein, the aperture adapted to receive a moveable piston shaft of the piston and cylinder apparatus, and a second head end cap adapted to form a pressure chamber between the head end cap and a moveable piston in the cylindrical composite tube.

7. The composite material and framework structure of claim 6, wherein said first blind end cap and said second head end cap each include a circumferentially and radially extending flange; and
   said at least one beam elements each including a groove adjacent either end of each said at least one beam element;
   said flange adapted to fit into a respective groove, said at least one beam element acting through said end caps applying said compression force to the cylindrical composite tube.

8. The composite material and framework structure of claim 7 wherein said at least one beam element includes reinforcing members increasing the tension load capabilities of the at least one beam element.

9. The composite material and framework structure of claim 1 wherein said at least one beam element includes a top beam element and two side beam elements, said side beam elements including mounting brackets having apertures, the apertures adapted to receive mounting bolts.

10. The composite material and framework structure of claim 9 wherein:
   a) internal pressure applied to the cylindrical composite tube creates the hoop stress in the cylindrical composite tube, a first force on one of the end caps, a second force on the other end cap, and a force on a piston disposed for movement within the cylindrical tube;
   b) the side beam elements transmit a shear force on one of the end caps and a portion of a resulting force moment to the mounting bolts; and
   c) the side beam and top beam elements, and the cylindrical composite tube and one of said end caps partially transmit a portion of the resulting force moment to the mounting bolts.

11. The composite material and framework structure of claim 10, wherein the cylindrical composite tube is under constant compression, and the top and side beam elements are under constant tension.

12. The composite material and framework structure of claim 1 wherein the compression force applied to the cylindrical composite tube by the end caps, in combination with the elastic properties of the cylindrical composite tube, provide a seal between the end caps and a circumferential edge of the composite tube that contacts a respective end cap.

13. A method of assembling a composite material and framework structure adapted to be utilized as a piston and cylinder apparatus, the method comprising the steps of:
   a) radially orienting a blind end cap and a head end cap over the opposite axial ends of a cylindrical composite tube;
   b) pressing the blind and head end caps over the corresponding ends of the cylindrical composite tube;
   c) applying an axial compression force to the blind end and head end caps, producing a compression strain in the cylindrical composite tube; and
   d) connecting at least one beam element between the blind end cap and the head end cap while the cylindrical composite tube is under compression stress.

14. The assembly method of claim 13 wherein the compression strain produced in the cylindrical composite tube approaches, but does not exceed, the compression strength of the cylindrical composite tube.

15. The assembly method of claim 13, including the further step of relieving the axial compressive force on the blind end and head end caps, the cylindrical composite tube expanding and locking the at least one beam element in position around the cylindrical composite tube.

* * * * *